United States Patent
Lundman

(10) Patent No.: US 11,085,572 B2
(45) Date of Patent: Aug. 10, 2021

(54) MECHANICAL PLUG

(71) Applicant: Philip L. Lundman, Fredonia, WI (US)

(72) Inventor: Philip L. Lundman, Fredonia, WI (US)

( * ) Notice: Subject to any disclaimer, the term of this patent is extended or adjusted under 35 U.S.C. 154(b) by 0 days.

(21) Appl. No.: 16/396,889

(22) Filed: Apr. 29, 2019

(65) Prior Publication Data

US 2019/0331282 A1 Oct. 31, 2019

Related U.S. Application Data

(60) Provisional application No. 62/664,594, filed on Apr. 30, 2018.

(51) Int. Cl.
*F16L 55/10* (2006.01)
*F16L 55/128* (2006.01)
*F16L 55/11* (2006.01)

(52) U.S. Cl.
CPC ............. *F16L 55/128* (2013.01); *F16L 55/11* (2013.01)

(58) Field of Classification Search
CPC ................................. F16L 55/128; F16L 55/11
USPC ...................................................... 138/90, 89
See application file for complete search history.

(56) References Cited

U.S. PATENT DOCUMENTS

| | | | | |
|---|---|---|---|---|
| 1,710,439 A | * | 4/1929 | Taylor | F16L 55/134 138/90 |
| 2,010,200 A | * | 8/1935 | Rufener | F16J 13/08 220/246 |
| 2,299,116 A | * | 10/1942 | Svirsky | F16L 55/134 138/90 |
| 2,610,651 A | * | 9/1952 | Hahn | G01M 3/022 138/90 |
| 3,451,259 A | * | 6/1969 | McNulty | G01M 3/2853 73/40.5 R |
| 3,568,721 A | * | 3/1971 | Ross | F28F 11/00 138/97 |
| 3,902,528 A | * | 9/1975 | Tartabini | G01M 3/005 138/90 |
| 4,565,222 A | | 1/1986 | Lundman | |
| 4,817,671 A | * | 4/1989 | Mathison | F16L 55/132 138/89 |
| 4,991,651 A | * | 2/1991 | Campbell | F16L 55/1283 138/89 |
| 5,353,842 A | | 10/1994 | Lundman | |
| 5,901,752 A | | 5/1999 | Lundman | |
| 6,446,669 B1 | | 9/2002 | Lundman | |

(Continued)

*Primary Examiner* — James F Hook
(74) *Attorney, Agent, or Firm* — Michael Best & Friedrich LLP

(57) ABSTRACT

A mechanical plug includes first and second plug portions and an elongate member. The first plug portion includes a first endwall and a first sidewall. The first sidewall includes a female section extending in a direction along a longitudinal axis of the mechanical plug. The second plug portion is movable relative to the first plug portion. The second plug portion includes a second sidewall, a second endwall coupled to the second sidewall, and a seal. The second sidewall includes a male section extending in a direction along the longitudinal axis. The seal surrounds a portion of the male section in a region along the longitudinal axis between the second endwall and the female section. The elongate member is coupled to the first and second plug portions. Actuation of the elongate member moves the first plug portion and the second plug portion toward each other to compress the seal.

17 Claims, 14 Drawing Sheets

(56) References Cited

U.S. PATENT DOCUMENTS

| | | | |
|---|---|---|---|
| 6,601,437 B2 * | 8/2003 | Gotowik | G01M 3/022 |
| | | | 138/89 |
| 6,899,138 B2 | 5/2005 | Lundman | |
| 6,959,734 B2 | 11/2005 | Lundman | |
| 6,966,343 B1 * | 11/2005 | Field | F16L 55/1283 |
| | | | 138/89 |
| 7,171,987 B2 * | 2/2007 | Serret | F16L 55/132 |
| | | | 138/89 |
| 7,455,077 B2 | 11/2008 | Lundman | |
| 8,894,115 B2 | 11/2014 | Lundman | |
| 8,936,045 B2 | 1/2015 | Lundman | |
| 9,611,739 B2 | 4/2017 | Lundman | |

\* cited by examiner

MECHANICAL PLUG

CROSS-REFERENCE TO RELATED APPLICATIONS

This application claims priority to U.S. Provisional Patent Application No. 62/664,594, filed Apr. 30, 2018, the entire contents of which are incorporated by reference herein.

TECHNICAL FIELD

The present invention generally pertains to mechanical plugs for conduits.

BACKGROUND

Inflatable plugs are sometimes used for plugging conduits, such as sewer lines, gas lines, or oil pipelines, to permit maintenance, facilitate toxic waste containment, or remove blockages. However, such plugs typically require coupling to fluid lines to facilitate inflation and deflation within conduits or multiple seal actuators for larger and higher pressure plugs.

SUMMARY

In one embodiment, the disclosure provides a mechanical plug for restricting fluid flow through a conduit. The mechanical plug includes a first plug portion, a second plug portion, and an elongate member. The first plug portion includes a first endwall and a first sidewall coupled to the first endwall. The first sidewall includes a female section extending in a direction along a longitudinal axis of the mechanical plug. The second plug portion is movable relative to the first plug portion. The second plug portion includes a second sidewall, a second endwall coupled to the second sidewall, and a seal. The second sidewall includes a male section extending in a direction along the longitudinal axis. The male section mates with the female section. The seal surrounds a portion of the male section. The seal is disposed in a region along the longitudinal axis between the second endwall and the female section. The elongate member is coupled to the first plug portion and the second plug portion. Actuation of the elongate member moves the first plug portion and the second plug portion toward each other to compress the seal in a direction along the longitudinal axis.

In another embodiment, the disclosure provides a method of restricting fluid flow through a conduit having an inner wall. The method includes positioning a mechanical plug in the conduit with the mechanical plug in a disengaged configuration; actuating an elongate member of the mechanical plug, thereby moving a first plug portion and a second plug portion of the mechanical plug toward each other to switch the mechanical plug to an engaged configuration; and compressing a seal of the mechanical plug, thereby pressing the seal against the inner wall to seal the conduit.

Other aspects of the disclosure will become apparent by consideration of the detailed description and accompanying drawings.

DETAILED DESCRIPTION

Figure 1:
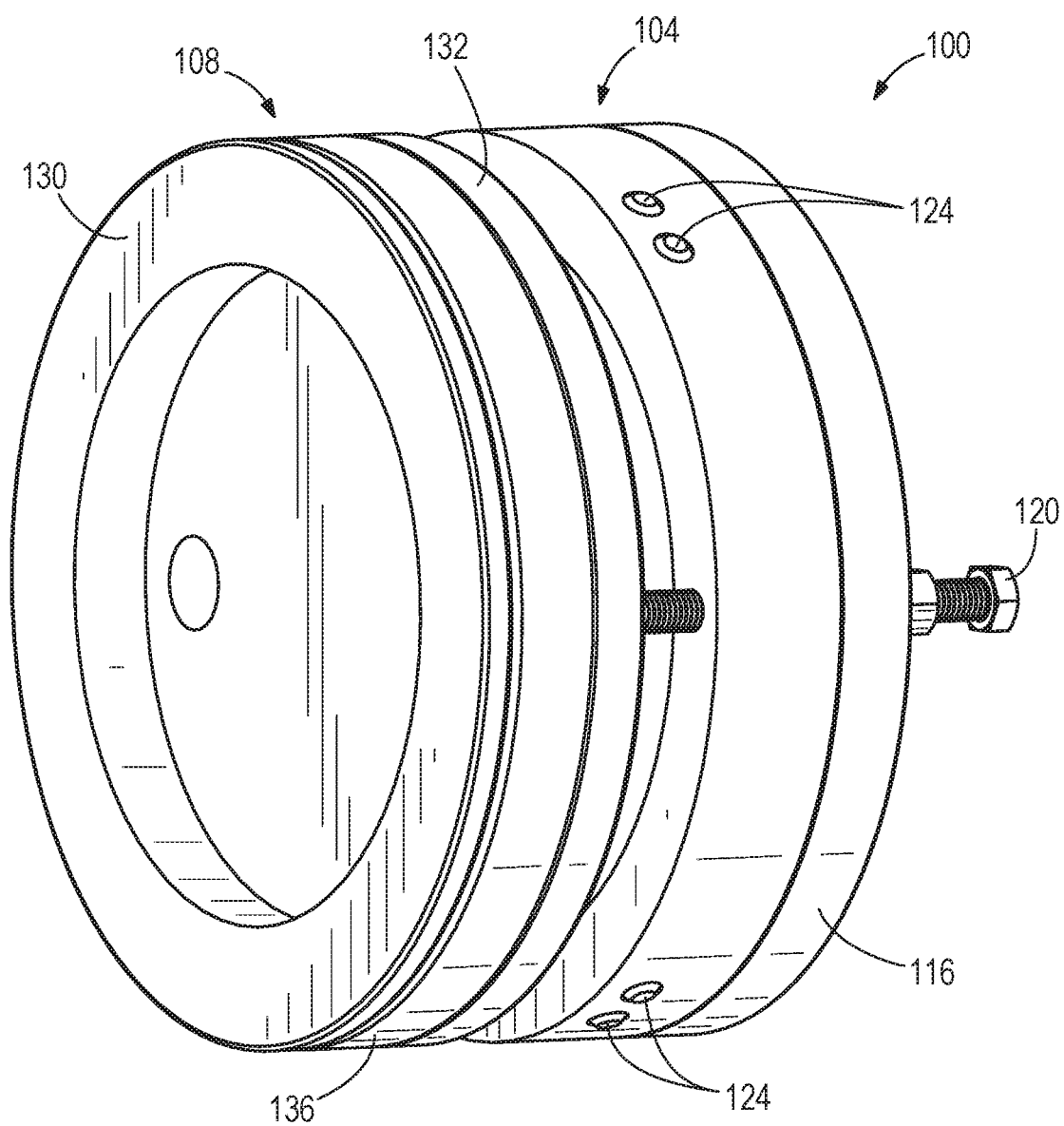
FIG. 1 is a perspective view of a mechanical plug according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention relate to mechanical plugs. While in a disengaged configuration, a mechanical plug is insertable into a conduit, such as a sewer line, an oil pipeline, a gas line, or a water main. The mechanical plug may be inserted through a hot tap in the conduit, for example.

In one embodiment, once inserted, an actuator member of the mechanical plug is activated (e.g., by a technician, diver, remote operated vehicle, or robot) to change the plug into an engaged configuration such that the plug is locked into place within the conduit. Once positioned, the plug is adjusted into a compressed configuration for restricting fluid flow through the conduit by compressing an elastomeric seal. In another embodiment, the mechanical plug is activated from a disengaged configuration to the compressed configuration without a separate engaged configuration.

Restricting fluid flow permits repair and/or maintenance (e.g., cleaning, patching holes, etc) to be performed on the conduit. In various embodiments, the mechanical plug does not couple with fluid lines for inflation and deflation of the mechanical plug.

The mechanical plug may be made of any suitable materials known in the art. For example, the mechanical plug may be primarily made of aluminum, stainless steel, and/or plated steel. The seal of the mechanical plug may be made of an elastomeric material, such as rubber, although the seal material can be suitably chosen based on chemical and temperature requirements. Generally, the materials should be suitable for most size, pressure, temperature, and chemical requirements typically necessary for restricting fluid flow in a conduit, such as a sewer line, an oil pipeline, a gas line, or a water main. Certain components of the mechanical plug could comprise other materials, such as other metals or alloys, other synthetic or natural polymers, a plastic material, a glass material, a ceramic material, a biomaterial, or a composite material.

FIGS. 1-4 illustrate a mechanical plug 100 according to an embodiment of the invention. The illustrated mechanical plug 100 includes a first plug portion 104, a second plug portion 108, and an elongate member 112. The first plug portion 104 has a first endwall 116, a first sidewall 144, a plurality of projections 120, and a plurality of locking pins 124. The second plug portion 108 has a second sidewall 128, a second endwall 130, an intermediate washer 132, and a seal 136.

Figure 2:
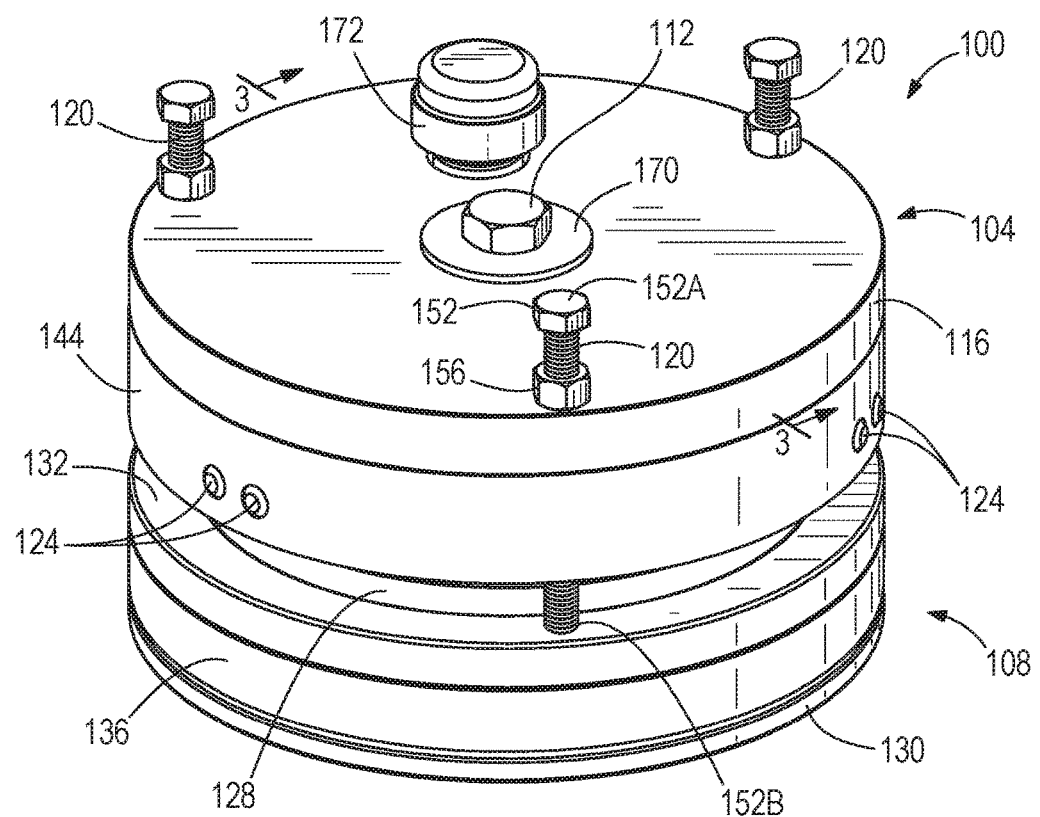
FIG. 2 is another perspective view of the mechanical plug of FIG. 1.
Figure 3:
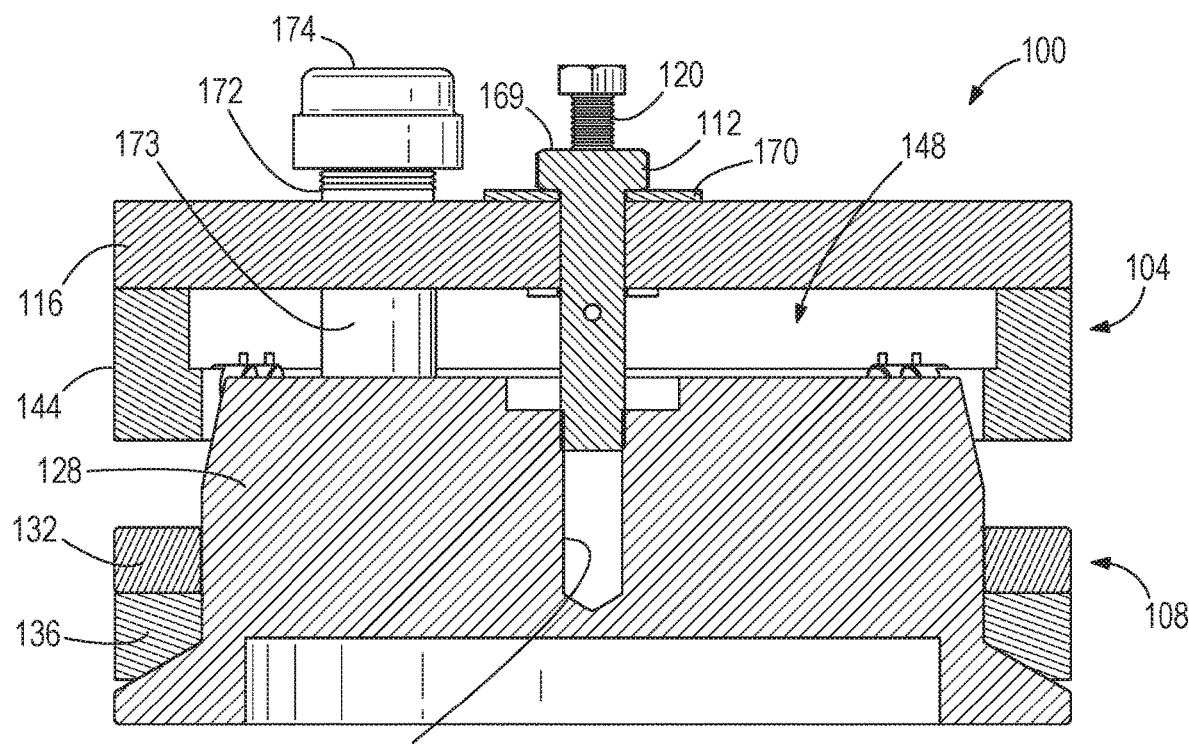
FIG. 3 is a cross-sectional view of the mechanical plug of FIG. 1 taken along section line 3-3 of FIG. 2.
Figure 4:
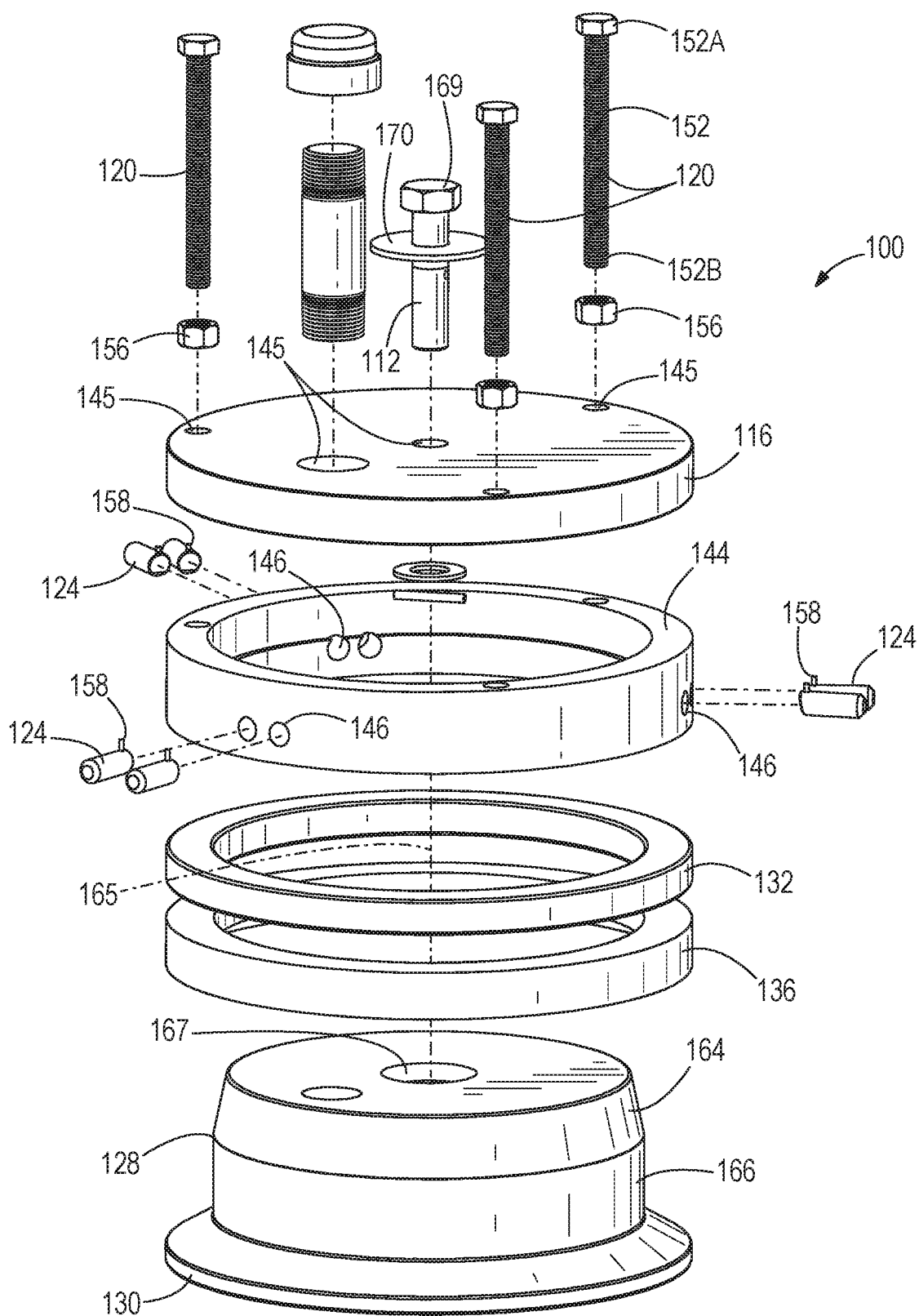
FIG. 4 is an exploded view of the mechanical plug of FIG. 1.

As shown in FIGS. 2-4, the first endwall 116 is secured to an end of the first sidewall 144. The first endwall 116 and the first sidewall 144 form a generally cylindrically-shaped structure that is shaped and sized to fit within a conduit. The size (e.g., diameter) of the first endwall 116 and the first sidewall 144 may be varied to fit different sizes of conduits. In some embodiments, the shape of the first endwall 116 and the first sidewall 144 may also be varied to fit other shapes of conduits (e.g., square, rectangular, octagonal, oblong, etc.) In the illustrated embodiment, the first endwall 116 and the first sidewall 144 are separate elements that are secured together (e.g., by the projections 120, by welding, etc.). In other embodiments, the first endwall 116 and the first sidewall 144 may be integrally formed as a single piece. The illustrated first endwall 116 is a generally solid member to restrict fluid flow, but defines apertures 145 (FIG. 4) to receive other structures (e.g., the projections 120, the elongate member 112) of the plug 100. The illustrated first sidewall 144 is annular in shape and defines a central opening 148 (FIG. 3) such that the first sidewall 144 includes a female section extending along a longitudinal axis 165 of the mechanical plug. The first sidewall 144 includes a flat inner wall such that the central opening 148 is cylindrical in shape. The first sidewall 144 also defines apertures 146 (FIG. 4) that receive the locking pins 142. The apertures 146 communicate with the central opening 148.

As shown in FIGS. 2 and 4, the projections 120 extend from the first endwall 116 and are spaced about a perimeter of the first endwall 116. In the illustrated embodiment, the projections 120 include bolts 152. Each bolt 152 includes a first end portion 152A, or head, and a second end portion 152B. The first end portion 152A is adjacent the first endwall 116 and configured to be engaged by a tool to rotate the bolt 152. The second end portion 152B extends from the first sidewall 144 toward the second plug portion 108. The bolts 152 are rotatable to adjust the distance or length that the second end portion 152B extends from the first sidewall 144. Additionally, the illustrated projections 120 include lock nuts 156 surrounding portions of the bolts 152. The lock nuts 156 abut the first endwall 116 to set the length that the bolts 152 extend from the first sidewall 144. In other embodiments, the projections 120 may include other types of projections, such as projections that are integrally-formed with or integrated into the first endwall 116.

As shown in FIGS. 2 and 4, the locking pins 124 are supported by the first sidewall 144. The locking pins 124 are slidably received in the apertures 146 of the first sidewall 144. The locking pins 124 may include three sets of locking pins 124, for example, circumferentially spaced about a circumference of the first sidewall 144. In certain embodiments, the three sets of locking pins 124 are spaced approximately 120 degrees apart from each other. In other embodiments, the locking pins 124 may only include three locking pins that are circumferentially spaced about the circumference of the first sidewall 144 such that each set of locking pins 124 only includes a single locking pin. In further embodiments, the plug 100 may include fewer or more locking pins 124 and/or the locking pins 124 may be unevenly spaced about the circumference. As shown in FIG. 4, each pin 124 includes a protrusion 158 to inhibit the pin 124 from sliding completely out of the corresponding aperture 146. The illustrated protrusions 158 extend radially from the locking pins 124.

As shown in FIGS. 3 and 4, the second sidewall 128 includes a male section extending in a direction along the longitudinal axis 165 of the mechanical plug 100. The second sidewall 128 extends from the second endwall 130 toward the first endwall 116. The illustrated second sidewall 128 includes a cam surface 164 formed at end opposite from the second endwall 130, and a constant diameter portion 166 between the cam surface 164 and the second endwall 130. The cam surface 164 is configured to be inserted into the central opening 148 of the first sidewall 144 such that the male section of the second sidewall 128 is received in the female section of the first sidewall 144. The cam surface 164 is further configured to engage the locking pins 124. The cam surface 164 is obliquely angled relative to the longitudinal axis (e.g., a central axis) 165 of the plug 100, such that the cam surface 164 decreases in diameter as the cam surface 164 extends into the central opening 148. The constant diameter portion 166 forms a flat surface between the second endwall 130 and the cam surface 164.

The second sidewall 128 also includes a central bore 167. The central bore 167 receives part of the elongate member 112 to selectively move the second plug portion 108 relative to the first plug portion 104, as further described below.

The second endwall 130 is secured to an end of the second sidewall 128 opposite from the first endwall 116. In the illustrated embodiment, the second endwall 130 is integrally formed as a single piece with the second sidewall 128. In other embodiments, the second sidewall 128 and the second endwall 130 may be separate elements that are secured together (e.g., by screws, welding, etc.). The second endwall 130 forms a flange at the end of the second sidewall 128. The second endwall 130 has a larger diameter than the rest of the second sidewall 128, such that the second endwall 130 extends radially outward from the central core.

As shown in FIGS. 3 and 4, the intermediate washer 132 surrounds a portion of the second sidewall 128. In the illustrated embodiment, the intermediate washer 132 surrounds the constant diameter portion 166 of the second sidewall 128. The intermediate washer 132 is positioned with the second endwall 130 on one side of the intermediate washer 132 and the cam surface 164 on the other side. The intermediate washer 132 is configured to engage the projections 120 extending from the first endwall 116. In other embodiments, the intermediate washer 132 may be omitted such that the projections 120 directly engage the seal 136, or the intermediate washer 132 may be integrated into the seal 136.

The seal 136 is positioned around a portion of the second sidewall 128 between the second endwall 130 and the intermediate washer 132. The illustrated seal 136 includes an elastomeric, annular member surrounding a portion of the second sidewall 128. The seal 136 is configured to be compressed between the second endwall 130 and the intermediate washer 132 when the intermediate washer 132 engages the projections 120. As the seal 136 compresses, the seal 136 expands radially outward to engage an inner surface of a conduit, blocking fluid flow through the conduit. In the illustrated embodiment, the seal 136 is a single member surrounding the second sidewall 128. In other embodiments, the seal 136 may include multiple discrete members positioned around the second sidewall 128 and/or a different means of expansion.

With continued reference to FIGS. 3 and 4, the elongate member 112 is supported by the first endwall 116 and extends through the central opening 148 of the first endwall 116 to couple to the second sidewall 128. In the illustrated embodiment, the elongate member 112 includes a threaded fastener 168, such as a bolt, threadably engaging the central bore 167 of second sidewall 128. The elongate member 112 also includes a head 169 (e.g., a bolt head) configured to be engaged by a tool (e.g., a wrench, a socket, etc.) to rotate the elongate member 112. As the elongate member 112 is rotated, the elongate member 112 pulls or pushes the second plug portion 108 toward or away from the first plug portion 104. The elongate member 112 further includes a washer 170 positioned between the head 169 and the first endwall 116 to facilitate rotating the elongate member 112. In the illustrated embodiment, the elongate member 112 is a single member extending along the longitudinal axis 165 of the mechanical plug 100. Such an arrangement allows the second plug portion 108 to be moved relative to the first plug portion 104 by actuating a single element. In other embodiments, the mechanical plug 100 may include different means for engaging and moving the second plug portion 108.

As shown in FIGS. 2-4, the mechanical plug 100 may also include a bypass valve 172 extending through the first plug portion 104 and the second plug portion 108. The bypass valve 172 selectively allows fluid flow through the first plug portion 104 and the second plug portion 108 to relieve pressure from stopped fluid flow in a conduit, for example. Additionally, the bypass valve 172 allows some flow through the mechanical plug 100 during installation before the plug 100 is completely secured within the conduit. The illustrated bypass valve 172 includes a pipe (or bypass passage) 173 and a removable cap 174. The pipe 173 extends through the mechanical plug 100. The removable cap 174 is removably coupled to (e.g., threaded onto) an end of the pipe 173. In other embodiments, the mechanical plug 100 may include other suitable bypass valves, or the bypass valve 172 may be omitted.

In certain embodiments, particularly for embodiments where the mechanical plug 100 is relatively large, additional components may be included that aid in the transport or portability of the mechanical plug 100. For example, in some embodiments, the plug 100 may include wheels. The wheels may be detachable or permanently connected to the first plug portion 104 and/or the second plug portion 108. The wheels may be, for example, caster swivel wheels. The wheels may also be powered, such as by an engine or a motor.

In further embodiments, the elongate member 112 may be energized or powered. For example, the elongate member 112 may include a solenoid or other type of motorized element that moves the second plug portion 108 relative to the first plug portion 104. In such embodiments, the mechanical plug 100 may include a processor and/or transceiver such that the plug 100 is capable of sending or receiving wireless signals to remotely control the elongate member 112. Additionally or alternatively, the plug 100 may include sensors (e.g., pressure sensors and/or cameras to transmit data to a remote user.

Figure 5:
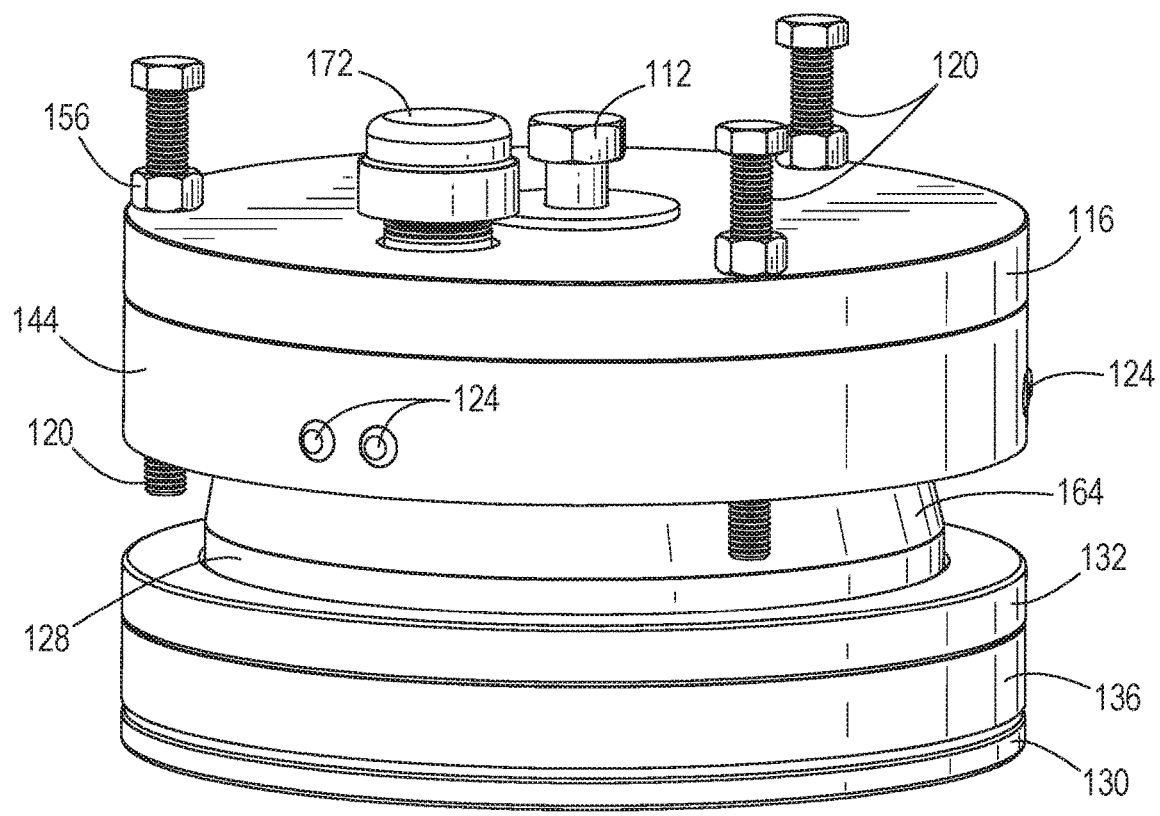
FIG. 5 is a perspective view of the mechanical plug of FIG. 1 in a disengaged configuration.
Figure 6:
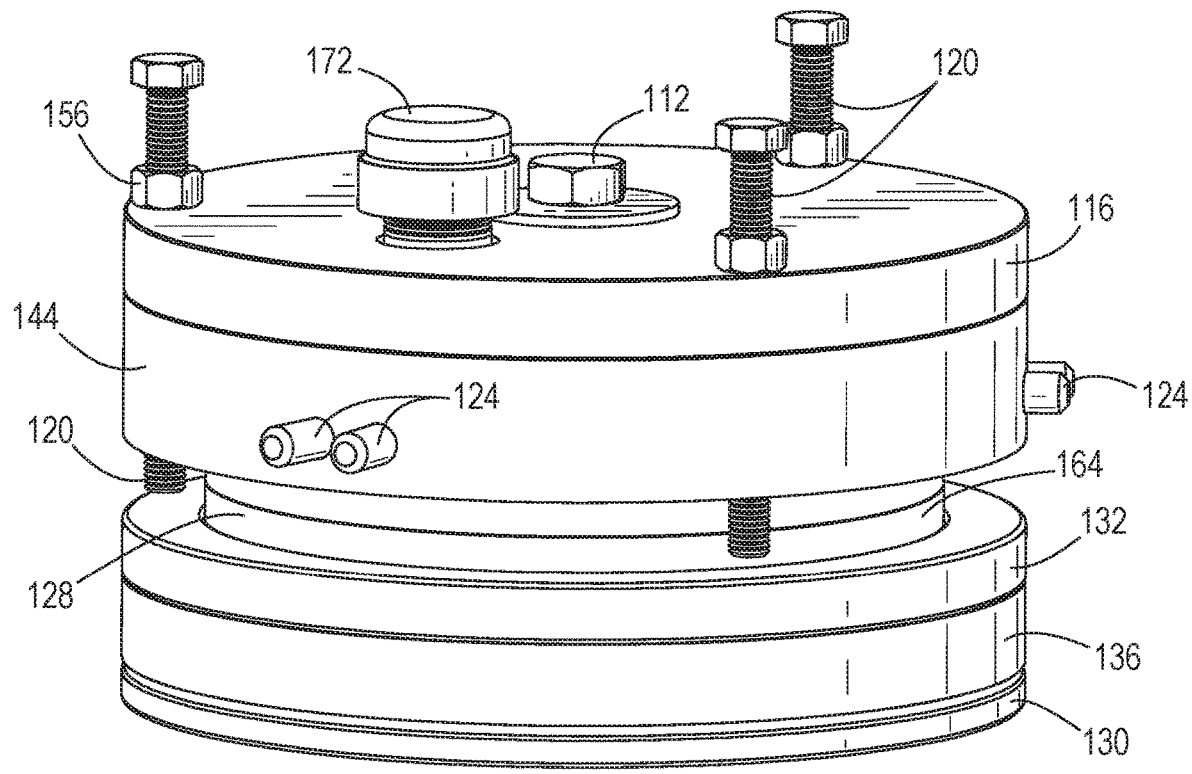
FIG. 6 is a perspective view of the mechanical plug of FIG. 1 in an engaged configuration.
Figure 7:
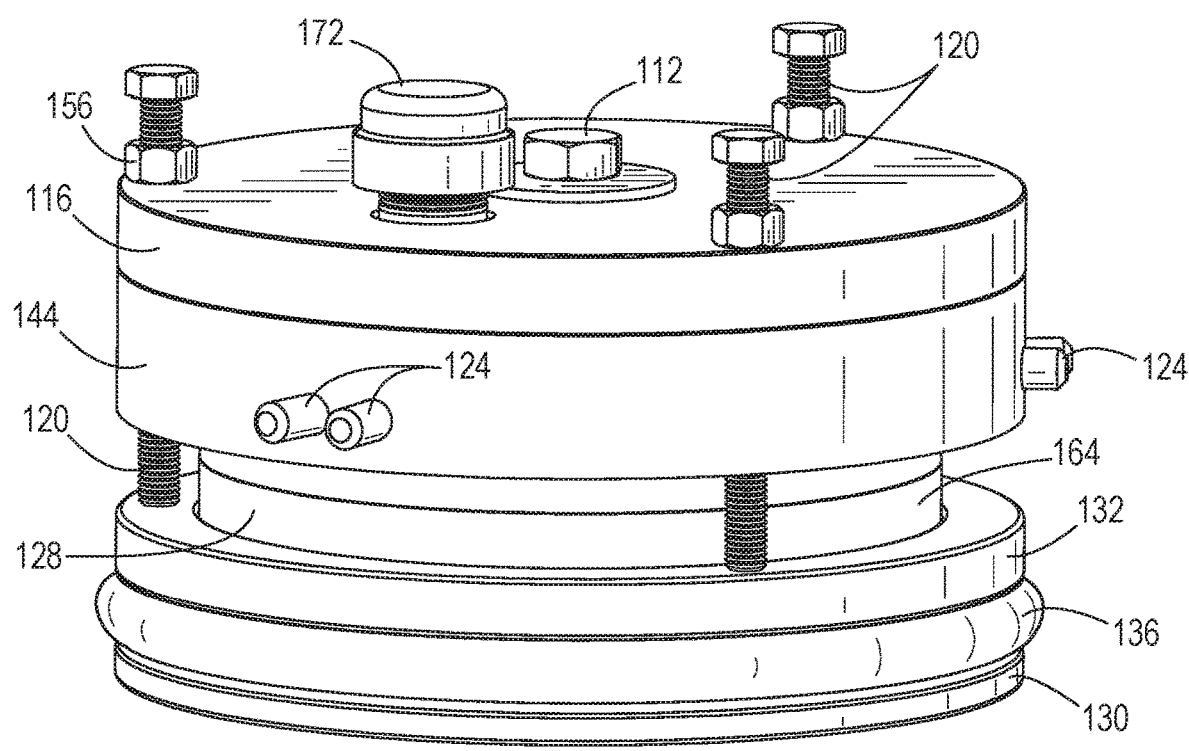
FIG. 7 is a perspective view of the mechanical plug of FIG. 1 in a compressed configuration.

FIGS. 5-7 illustrate operation of the mechanical plug 100. As shown in FIG. 5, the plug 100 is in a first or disengaged configuration. In this configuration, the first plug portion 104 and the second plug portion 108 are coupled together by the elongate member 112, but are not tightened against each other. As such, the locking pins 124 are retracted within the first sidewall 144, and the projections 120 are spaced apart from the intermediate washer 132 so the seal 136 is not compressed. While in this configuration, the plug 100 is positionable within a conduit.

FIG. 6 illustrates the mechanical plug 100 in a second or engaged configuration. In this configuration, the elongate member 112 is actuated (e.g., rotated) to move the second plug portion 108 toward the first plug portion 104. As the elongate member 112 rotates, the cam surface 164 extends into (or further into) the central opening 148 to engage the plurality of locking pins 124. The cam surface 164 pushes the locking pins 124 outward from the first sidewall 144 to engage an inner surface of the conduit. The locking pins 124, thereby, help lock and center the plug 100 in place within the conduit. The elongate member 112 can continue to be actuated until, for example, the projections 120 abut the intermediate washer 132 or the cam surface 164 contacts the first sidewall 144.

After the elongate member 112 moves the second plug portion 108 toward the first plug portion 104, the projections 120 are tightened to compress the seal 136. FIG. 7 illustrates the mechanical plug 100 in a third or compressed configuration. In this position, the bolts 152 can be rotated or otherwise moved such that the second end portions 152B press against the intermediate washer 132. The intermediate washer 132 then compresses the seal 136 against the flange formed by the second endwall 130, causing the seal 136 to bulge radially outward. In this configuration, the seal 136 engages the inner surface of the conduit to restrict fluid flow through the conduit.

In the embodiment described above, the projections 120 are moved after the elongate member 112 is engaged to move the second plug portion 108 toward the first plug portion 104. In this case, the seal 136 is not compressed by the plurality of projections 120 immediately while the locking pins 124 are engaged. This arrangement may be advantageous when it is desirable to place the mechanical plug 100 in a conduit before or without completely restricting fluid flow in a conduit.

In other embodiments, the seal 136 may be compressed as the elongate member 112 is actuated. For example, the lengths of the projections 120 extending from the first sidewall 144 may be set so that the second end portions 152B engage the intermediate washer 132 at the same time the cam surface 164 pushes the locking pins 124 radially outward. In such an arrangement, the lock nuts 156 may be used to set and hold the lengths of the projections 120 prior to actuating the elongate member 112. This arrangement may be advantageous to more quickly and easily install the mechanical plug 100 in a hard to reach location by only requiring actuation of one element (e.g., the elongate member 112).

Figure 8:
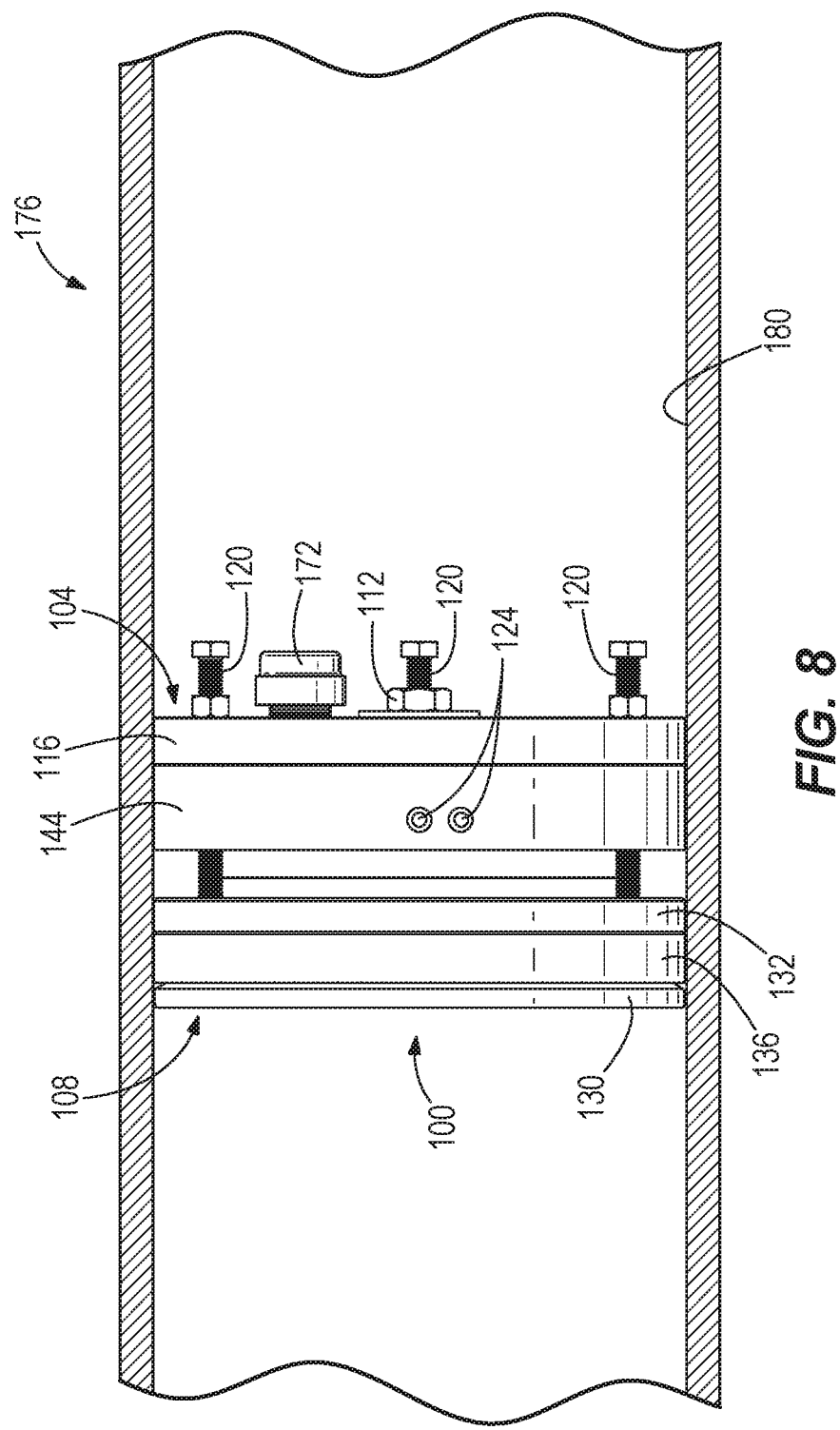
FIG. 8 shows the mechanical plug of FIG. 1 within a conduit to restrict fluid flow.
Figure 9:
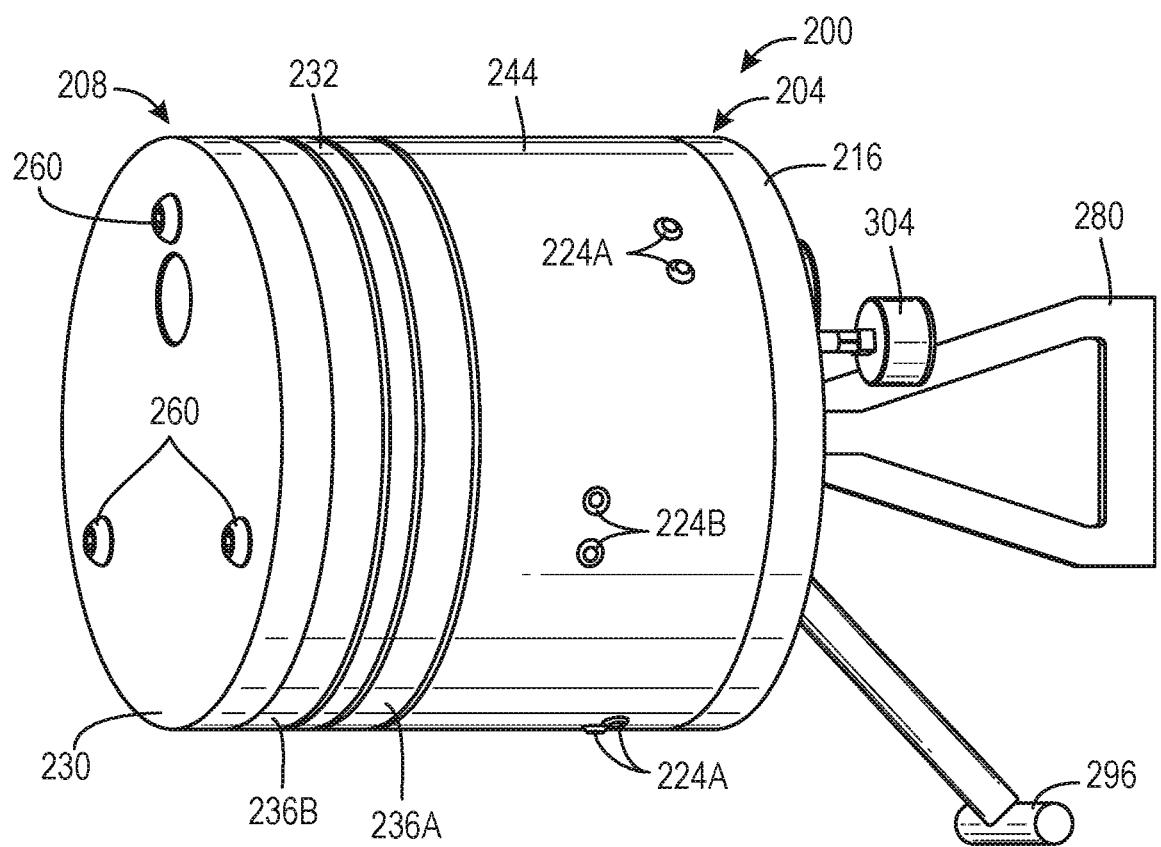
FIG. 9 is a perspective view of a mechanical plug according to another embodiment of the invention.

FIG. 8 shows the mechanical plug 100 in a conduit 176 having an inner wall 180, The mechanical plug 100 is shown in the compressed configuration to restrict fluid flow through the conduit 176, In certain embodiments, the locking pins 124 self-center the mechanical plug 100 relative to the inner wall 180, due to a directional fluid pressure in the conduit 176. The directional fluid pressure may also further compress the seal 136.

FIGS. 9-12 illustrate a mechanical plug 200 according to another embodiment of the invention. The illustrated mechanical plug 200 includes a first plug portion 204, a second body plug portion 208, and an elongate member 212. The first plug portion 204 has a first endwall 216, a first sidewall 244, and two sets of locking pins 224A, 224B. The second plug portion 208 has a second sidewall 228, a second endwall 230, an intermediate washer 232, and two seals 236A, 236B.

Figure 10:
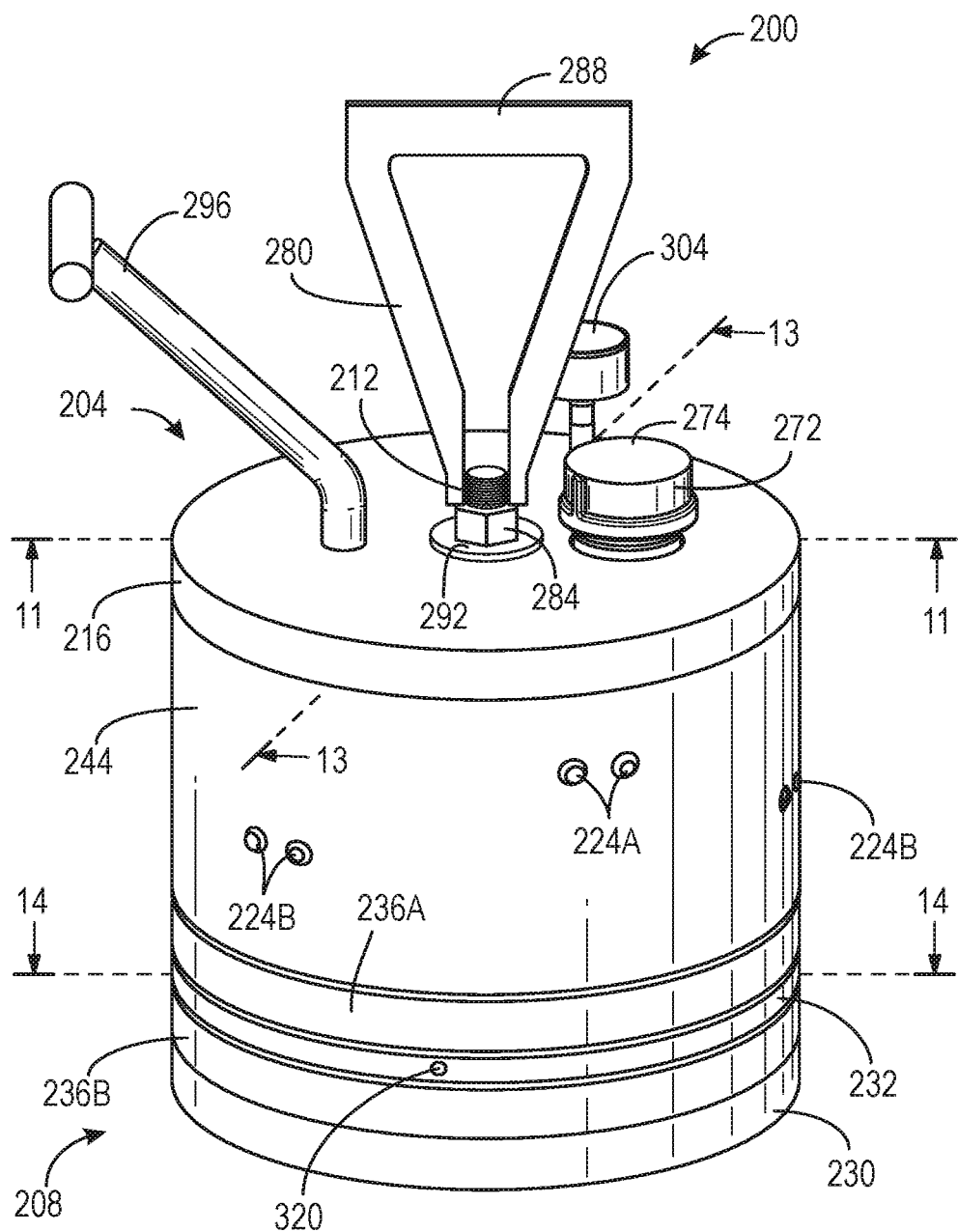
FIG. 10 is another perspective view of the mechanical plug of FIG. 9.
Figure 11:
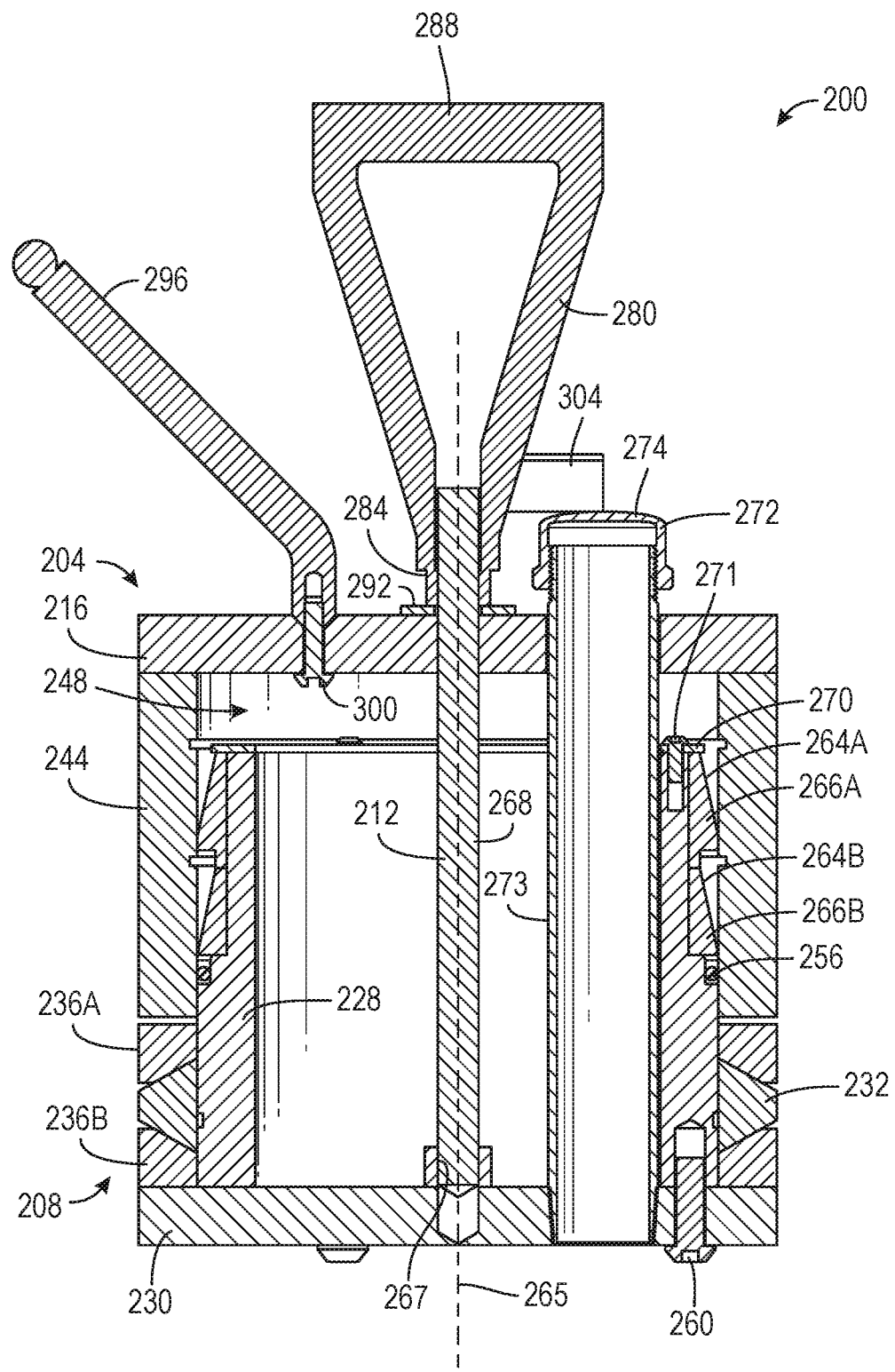
FIG. 11 is a cross-sectional view of the mechanical plug of FIG. 9 taken along section line 11-11 of FIG. 10.
Figure 12:
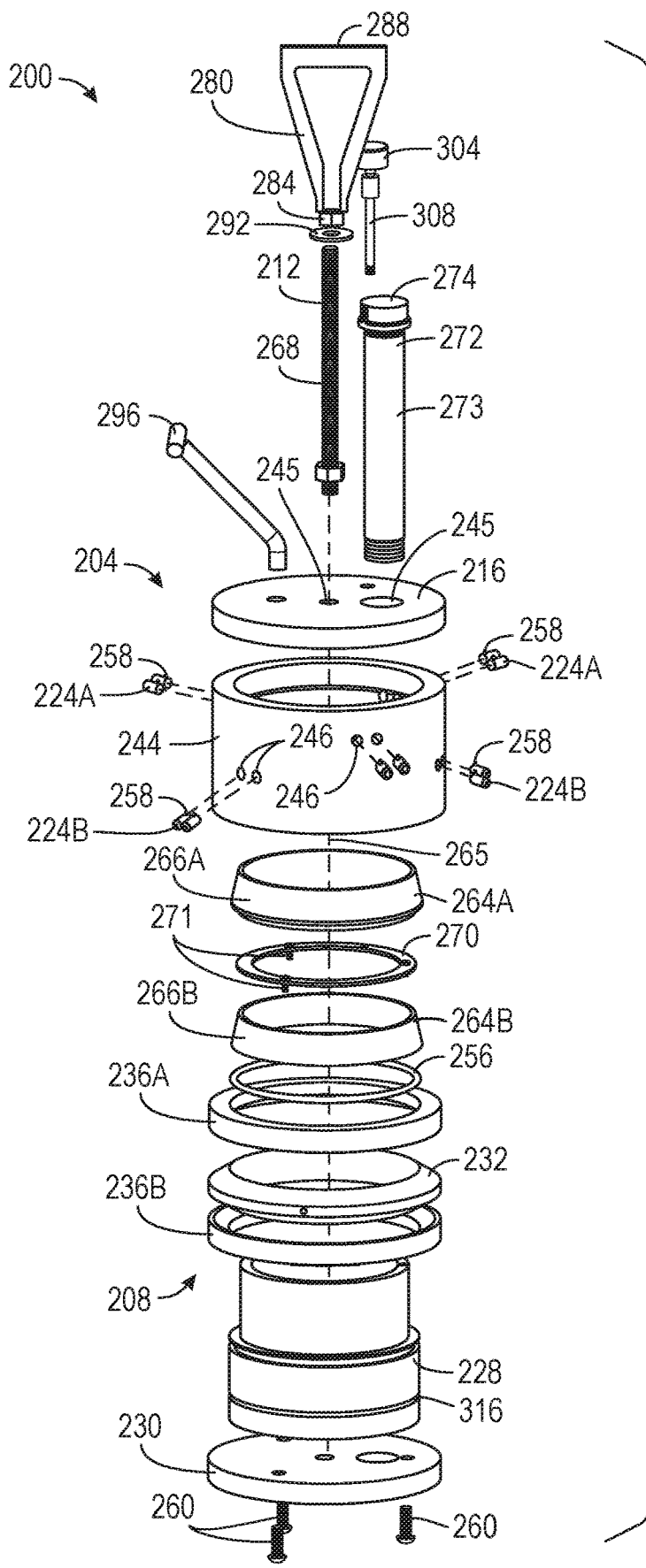
FIG. 12 is an exploded view of the mechanical plug of FIG. 9.

As shown in FIGS. 10-12, the first endwall 216 is secured to an end of the first sidewall 244. The first endwall 216 and the first sidewall 244 form a generally cylindrically-shaped structure that is shaped and sized to fit within a conduit. The size (e.g., diameter) of the first endwall 216 and the first sidewall 244 may be varied to fit different sizes of conduits. In some embodiments, the shape of the first endwall 216 and the first sidewall 244 may also be varied to fit other shapes of conduits (e.g., square, rectangular, octagonal, oblong, etc.). In the illustrated embodiment, the first endwall 216 and the first sidewall 244 are separate elements that are secured together (e.g., by welding, screws, elongate member 212, etc.). In other embodiments, the first endwall 216 and the first sidewall 244 may be integrally formed as a single piece. The illustrated first endwall 216 is a generally solid member to restrict fluid flow, but defines apertures 245 (FIG. 12) to receive other structures (e.g., the elongate member 212) of the plug 200. The illustrated first sidewall 244 is annular in shape and defines a central opening 248 (FIG. 11). The first sidewall 244 includes a flat inner wall such that the central opening 248 is cylindrical in shape. The first sidewall 244 also defines apertures 246 (FIG. 12) that receive the locking pins 224A, 224B. The apertures 246 communicate with the central opening 248.

As shown in FIGS. 10 and 12, the locking pins 224A, 224B are supported by the first sidewall 244. The locking pins 224A, 224B are slidably received in the apertures 246 of the first sidewall 244. In the illustrated embodiment, the first plug portion 204 includes two sets of locking pins 224 that are axially offset from each other. The first set of locking pins 224A are positioned closer to the first endwall 216, and the second set of locking pins 224B are positioned closer to an end of the first sidewall 244 opposite from the first endwall 216. Each set of locking pins 224A, 224B includes three pairs of locking pins circumferentially spaced about a circumference of the first sidewall 244. In the illustrated embodiment, the pairs of locking pins in each set of locking pins 224A, 224B are spaced approximately 120 degrees apart from each other. The second set of locking pins 224B is also circumferentially offset from the first set of locking pins 224A. That is, each pair of locking pins in the second set of locking pins 224B is positioned between two adjacent pairs of locking pins in the first set of locking pins 224A in a circumferential direction. In other embodiments, each set of locking pins 224A, 224B may include fewer or more pairs and/or may include single locking pins rather than pairs of locking pins. In addition, the plug 200 may include fewer or more locking pins 224A, 224B, the locking pins 224A, 224B may be unevenly spaced about the circumference, and/or the locking pins 224A, 224B may not be axially offset. As shown in FIG. 12, each locking pin 224A, 224B includes a protrusion 258 to inhibit the pin 224A, 224B from sliding completely out of the corresponding aperture 246. The illustrated protrusions 258 extend radially from the locking pins 224A, 224B.

As shown in FIGS. 11 and 12, the second sidewall 228 extends from the second endwall 230 toward the first endwall 216. The second sidewall 228 includes two cam surfaces 264A, 264B positioned adjacent an end of the second sidewall 228 opposite from the second endwall 230. In the illustrated embodiment, the cam surfaces 264A, 264B are formed on cam rings 266A, 266B that are secured to the second sidewall 228. The cam rings 266A, 266B are held in place by a stop ring 270 that is secured to the second sidewall 228 by fasteners 271 (e.g., screws). In other embodiments, the cam surfaces 264A, 264B may be integrally formed on the second sidewall 228, or the cam rings 266A, 266B may be secured to the second sidewall 228 using other suitable means. The cam surfaces 264A, 264B are configured to be inserted into the central opening 248 of the first sidewall 244 and engage the locking pins 224A, 224B. More particularly, the first cam surface 264A is configured to engage the first set of locking pins 224A, and the second cam surface 264B is configured to engage the second set of locking pins 224B. The cam surfaces 264A, 264B are obliquely angled relative to a longitudinal axis 265 of the plug 200, such that the cam surfaces 264A, 264B decrease in diameter as they extend into the central opening 248.

An O-ring 256 is supported by the second sidewall 228 adjacent the second cam surface 264B. The O-ring 256 engages the inner surface of the first sidewall 244 to create a fluid tight seal between the second sidewall 228 and the first sidewall 244 when the second sidewall 228 is inserted into the central opening 248.

The second endwall 230 is secured to an end of the second sidewall 228 opposite from the first endwall 216. In the illustrated embodiment, the second endwall 230 is connected to the second sidewall 228 by fasteners 260 (e.g., screws). In other embodiments, the second endwall 230 may be integrally formed as a single piece with the second sidewall 228. The second endwall 230 forms a flange at the end of the second sidewall 228. The second endwall 230 has a larger diameter than the rest of the second sidewall 228, such that the second endwall 230 extends radially outward from the second sidewall 228.

As shown in FIGS. 11 and 12, the intermediate washer 232 surrounds a portion of the second sidewall 228. The intermediate washer 232 is positioned between the seals 236A, 236B. The intermediate washer 232 includes an outer profile that generally matches an outer profile of the seals 236A, 236B such that the seals 236A, 236B seat on the intermediate washer 232. In other embodiments, the intermediate washer 232 may be integrated into one or both of the seals 236A, 236B.

The seals 236A, 236B are positioned around portions of the second sidewall 228 on opposite sides of the intermediate washer 232. In the illustrated embodiment, the plug 200 includes two seals 236A, 236B. In other embodiments, the plug 200 may include fewer or more seals 236A, 236B. The first seal 236A is positioned between the intermediate washer 232 and the first sidewall 244. The second seal 236B is positioned between the intermediate washer 232 and the second endwall 230. The illustrated seals 236A, 236B include elastomeric, annular members surrounding the second sidewall 228. The seals 236A, 236B are configured to be compressed between the second endwall 230 and the first sidewall 244 when the second plug portion 208 moves toward the first plug portion 204. In particular, the first sidewall 244 engages the first seal 236A to compress the first seal 236A between the first sidewall 244 and the intermediate washer 232. Force provided by the first seal 236A against the intermediate washer 232 pushes the intermediate washer 232 against the second seal 236, compressing the second seal 236B between the intermediate washer 232 and the second endwall 230. In the illustrated embodiment, the first sidewall 244 directly engages the first seal 236A to compress the first seal 236A. In other embodiments, the first sidewall 244 may indirectly engage the first seal 236A through an intermediate member. As the seals 236A, 236B compress, the seals 236A, 236B expand radially outward to engage an inner surface of a conduit, blocking fluid flow through the conduit. In the illustrated embodiment, each seal 236A, 236B is a single member surrounding the second sidewall 228. In other embodiments, each seal 236A, 236B may include multiple discrete members positioned around the second sidewall 228 and/or different means of expansion.

As shown in FIGS. 11 and 12, the elongate member 212 is supported by the first endwall 216 and extends through the central opening 248 of the first endwall 216 to couple to the second endwall 230. In the illustrated embodiment, the elongate member 212 includes a threaded fastener 268, such as a bolt, threadably engaging a central bore 267 of the second endwall 230. As the elongate member 212 is rotated, the elongate member 212 pulls or pushes the second plug portion 208 toward or away from the first plug portion 204. In the illustrated embodiment, the elongate member 212 is a single member extending along the longitudinal axis 265 of the mechanical plug 200. Such an arrangement allows the second plug portion 208 to be moved relative to the first plug portion 204 by actuating a single element. In other embodiments, the mechanical plug 200 may include different means for engaging and moving the second endwall 230.

The illustrated elongate member 212 optionally includes a first handle 280. The first handle 280 includes a nut 284 that threads onto the threaded fastener 268 and a grip 288 extending outwardly from the nut 284. A washer 292 is positioned between the nut 284 and the first endwall 216. The grip 288 is configured to be grasped by a remote operated vehicle (ROV), such as an underwater robot. The ROV can rotate the grip 288 to actuate the elongate member 212, moving the second plug portion 208 toward or away from the first plug portion 204. In other embodiments, a human may grasp and rotate the grip 288 to actuate the elongate member 212.

The illustrated plug 200 also optionally includes a second handle 296 attached to and extending from the first endwall 216. The second handle 296 is secured to the first endwall 216 with a fastener 300 (e.g., a screw) The second handle 296 provides a ground or stabilizer that can be grasped by the ROV such that the ROV has leverage to actuate the elongate member 212 with the first handle 280. In other embodiments, the first handle 280 and/or the second handle 296 may be omitted.

As shown in FIGS. 10-12, the mechanical plug 200 may also include a bypass valve 272 extending through the first plug portion 204 and the second plug portion 208. The bypass valve 272 selectively allows fluid flow through the first plug portion 204 and the second plug portion 208 to relieve pressure from stopped fluid flow in a conduit, for example. Additionally, the bypass valve 272 allows some flow through the mechanical plug 200 during installation before the plug 200 is completely secured within the conduit. The illustrated bypass valve 272 includes a pipe (or bypass passage) 273 and a removable cap 274. The pipe 273 extends through the mechanical plug 200. The removable cap 274 is removably coupled to (e.g., threaded onto) an end of the pipe 273. In other embodiments, the mechanical plug 200 may include other suitable bypass valves, or the bypass valve 272 may be omitted.

Figure 13:
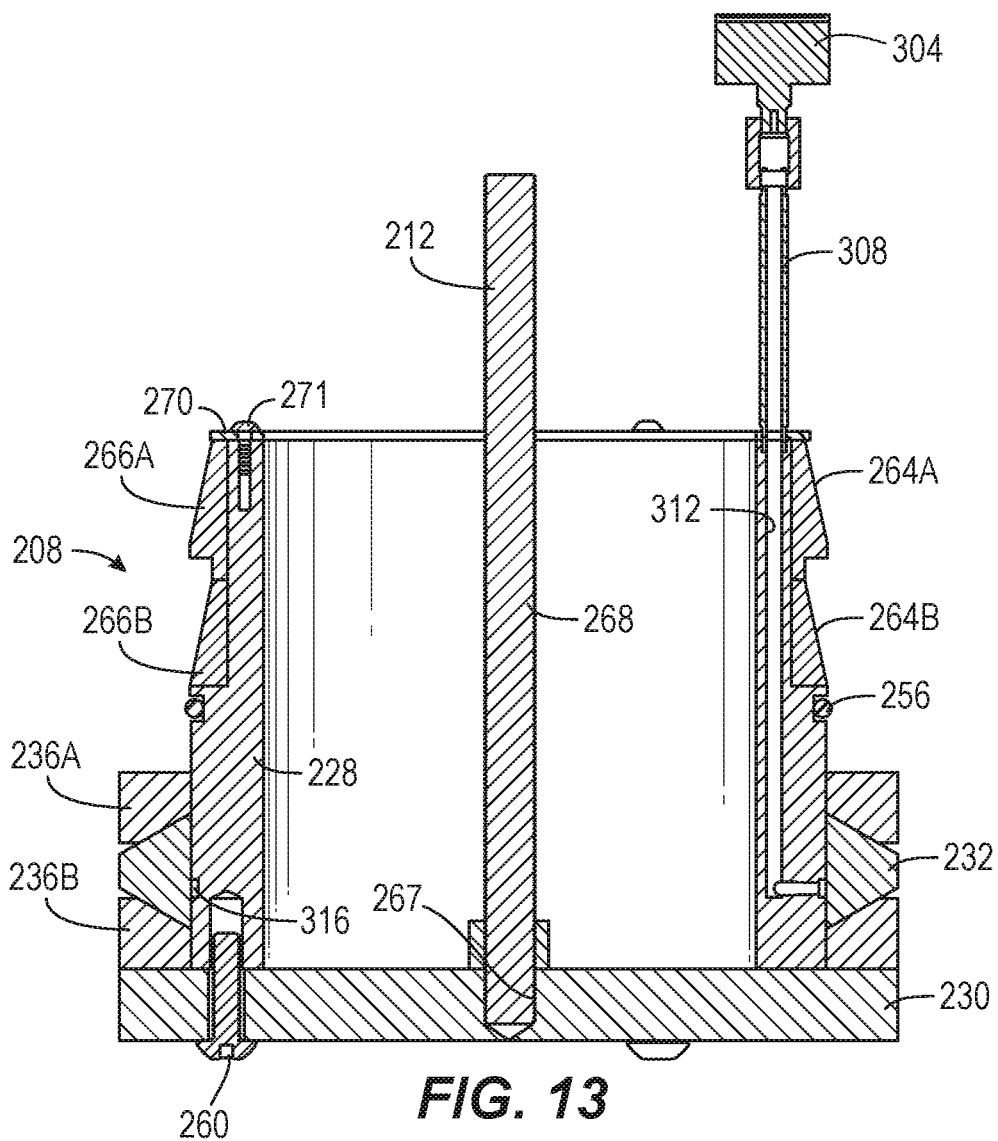
FIG. 13 is a cross-sectional view of the mechanical plug of FIG. 9 taken along section line 13-13 of FIG. 10.
Figure 14:
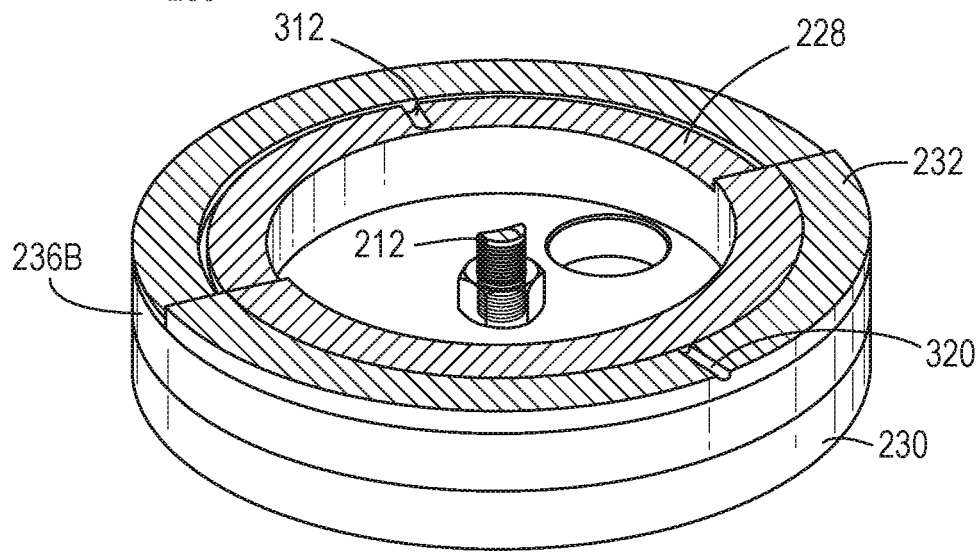
FIG. 14 is a cross-sectional view of the mechanical plug of FIG. 9 taken along section line 14-14 of FIG. 9.

The illustrated mechanical plug 200 may further include a pressure gauge 304. The gauge 304 is used to measure pressure between the seals 236A, 236B. In the illustrated embodiment, the gauge 304 is supported by the first endwall 216 and communicates with a space between the seals 236A, 236B via a series of a series of channels. As shown in FIG. 13, a pipe 308 extends between the gauge 304 and the second sidewall 228. The gauge 304 is in fluid communication with a first channel 312 defined in the second sidewall 228 via the pipe 308. A circumferential channel 316, or groove, is formed in an outer surface of the second sidewall 228 behind the intermediate washer 232. The intermediate washer 232 defines a second channel 320 that is in fluid communication with the circumferential channel 316 and, thereby, the first channel 312. The second channel 320 is also in fluid communication with the space between the seals 236A, 236B such that the gauge 304 can measure a pressure within the space. This arrangement allows the mechanical plug 200 to be used for double block and bleed processes to test, for example, the integrity of a joint between two adjacent conduits. In the illustrated embodiment, the gauge 304 is removably coupled to the pipe 308. In other embodiments, the gauge 304 may be omitted.

Similar to the mechanical plug 100 described above, the mechanical plug 200 may also include components that aid in the transport of the plug 200 and/or the elongate member 212 may be powered or remotely controlled.

Figure 15:
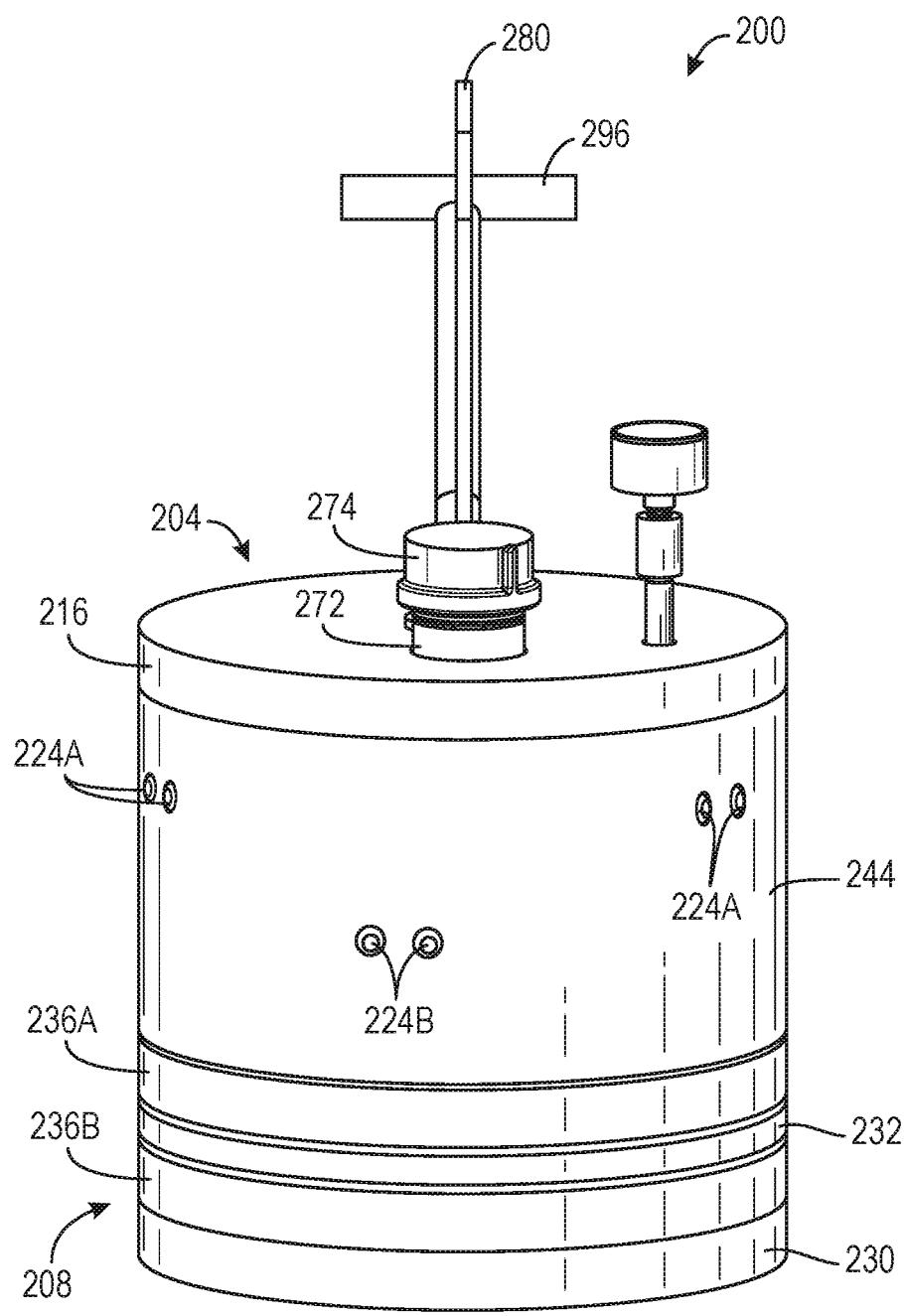
FIG. 15 is a perspective view of the mechanical plug of FIG. 9 in a disengaged configuration.
Figure 16:
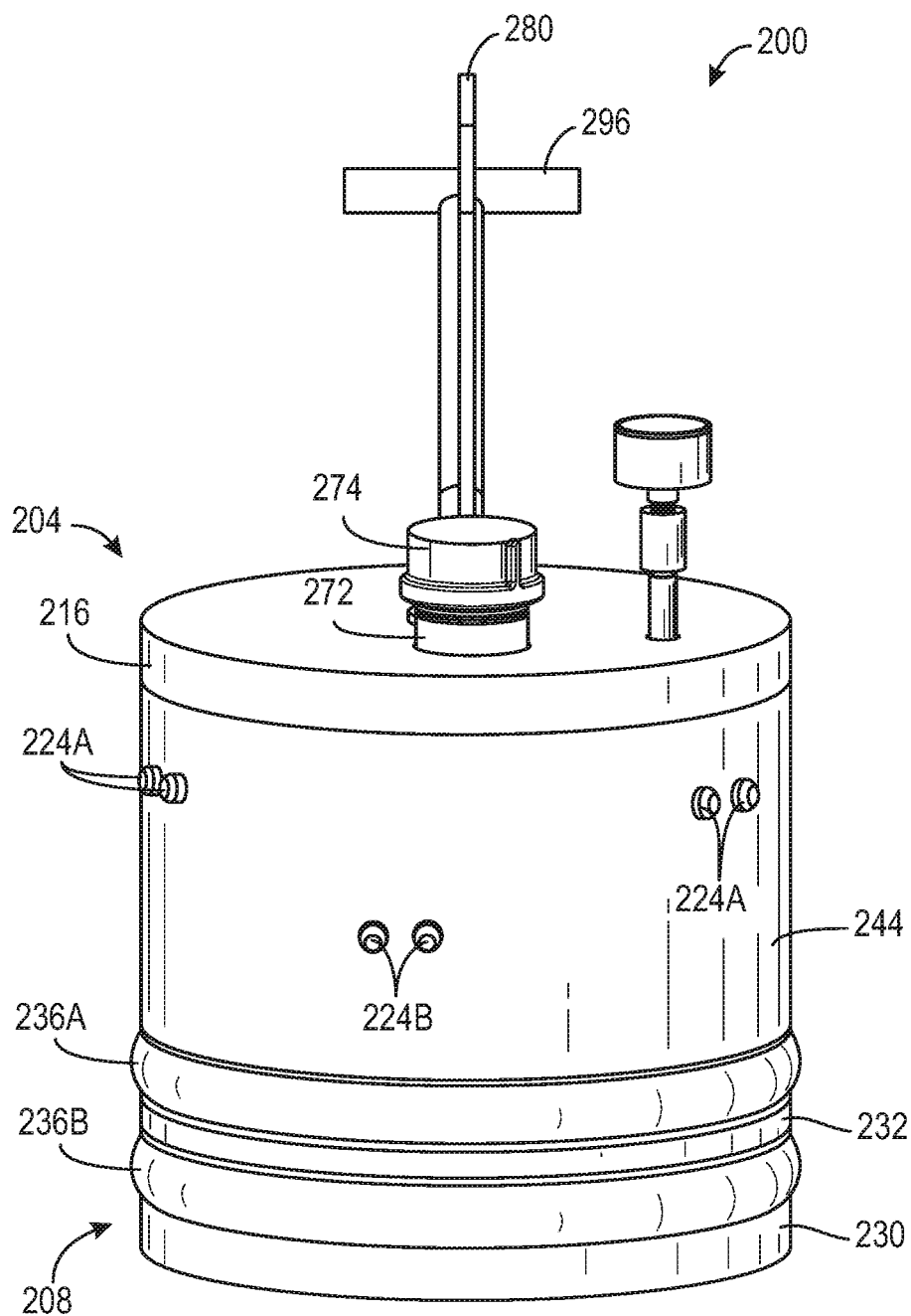
FIG. 16 is a perspective view of the mechanical plug of FIG. 9 in a compressed configuration.

FIGS. 15 and 16 illustrate operation of the mechanical plug 200. As shown in FIG. 15, the plug 200 is in a first or disengaged configuration. In this configuration, the first plug portion 204 and the second plug portion 208 are coupled together by the elongate member 212, but are not tightened against each other. As such, the locking pins 224A, 224B are retracted within the first sidewall 244, and the seals 236A, 236B are not compressed. While in this configuration, the plug 200 is positionable within a conduit.

FIG. 16 illustrates the mechanical plug 200 in a second or compressed configuration. In this configuration, the elongate member 212 is actuated (e.g., rotated) to move the second plug portion 208 toward the first plug portion 204. As the elongate member 212 rotates, the cam surfaces 264A, 264B extend into (or further into) the central opening 248 to engage the plurality of locking pins 224A, 224B. The cam surfaces 264A, 264B push the locking pins 224A, 224B outward from the first endwall 216 to engage an inner surface of the conduit. The locking pins 224, thereby, help lock and center the plug 200 in place within the conduit.

When the elongate member 212 pulls the first plug portion 204 and the second plug portion 208 sufficiently close, the first sidewall 244 also compresses the first seal 236A against the intermediate washer 232, which then compresses the second seal 236B against the second endwall 230, causing the seals 236A, 236B to bulge radially outward. In this configuration, the seals 236A, 233613 engage the inner surface of the conduit to restrict fluid flow through the conduit.

In the embodiment described above, the seals 236A, 236B are compressed as the elongate member 212 is actuated. This arrangement may be advantageous to quickly and easily install the mechanical plug 200 in a hard to reach location, such as a vertically aligned conduit, by only requiring actuation of one element (e.g., the elongate member 212).

Figure 17:
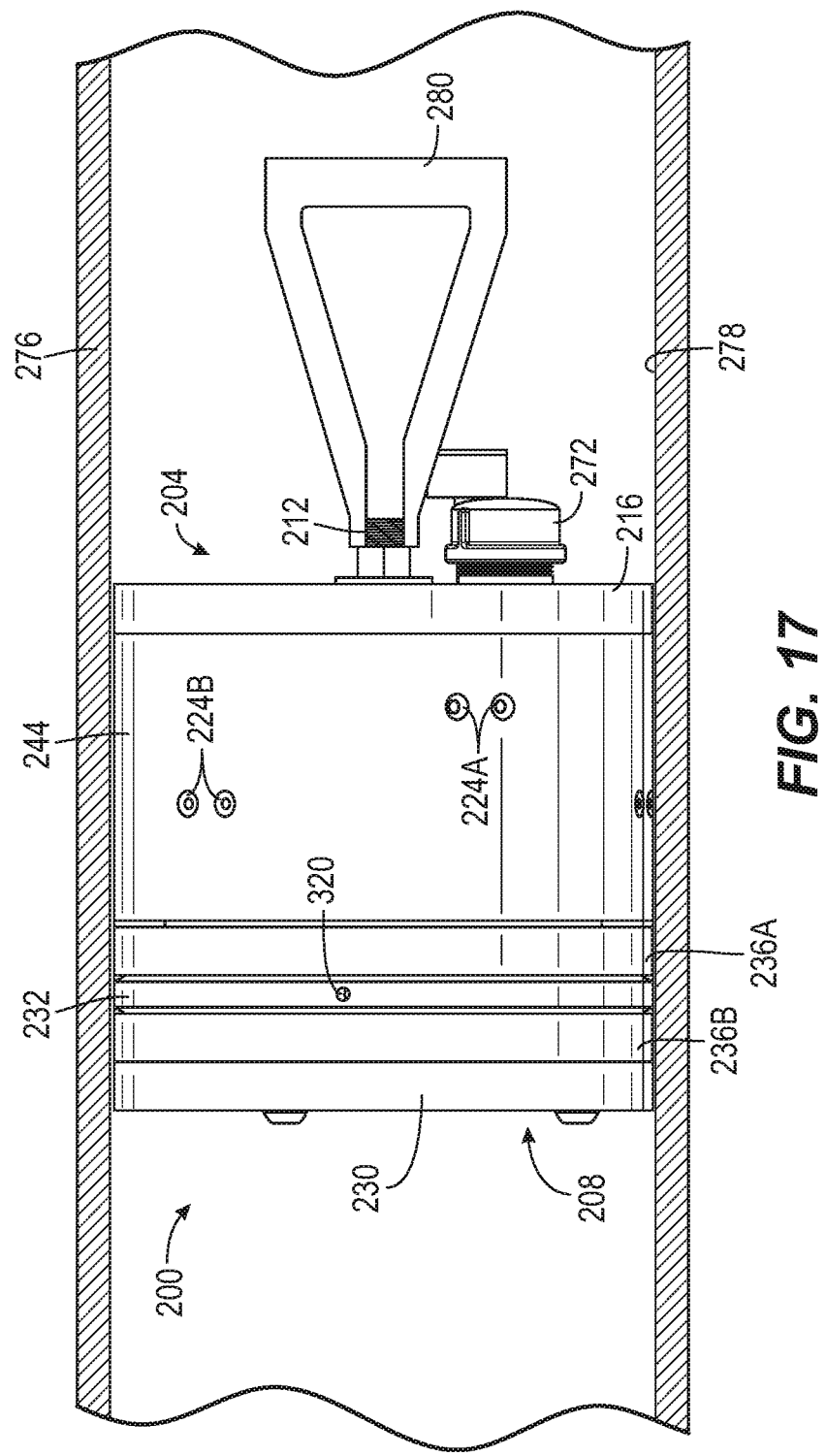
FIG. 17 shows the mechanical plug of FIG. 9 within a conduit to restrict fluid flow.

FIG. 17 shows the mechanical plug 200 in a conduit 276 having an inner wall 278. The mechanical plug 200 is shown in the compressed configuration to restrict fluid flow through the conduit 276. In certain embodiments, the locking pins 224A, 224B self-center the mechanical plug 200 relative to the inner wall 280, due to a directional fluid pressure in the conduit 276. The directional fluid pressure may also help further compress the seals 236A, 236B.

In the embodiment described above, the plug 200 was suitably operable up to a pressure of (at least) 400 psi.

The mechanical plugs described herein have the distinct advantage that there is no need to transport and couple fluid lines to the plug to create a fluid-tight seal. A diver or underwater robot (e.g., ROV), for example, may install the mechanical plug without assistance from technicians external to the conduit. As detailed above, a single actuator member can seal or unseal the mechanical plug, and the plug is self-centering for relatively simple installation. In certain embodiments, the mechanical plug is completely reusable and, if necessary, the seal is simple to replace. The mechanical plug is also designed to be scalable in size and otherwise customizable for severe conditions. For example, the plug is excellent for subsea applications and/or remote placement.

Various features and advantages of the invention are set forth in the following claims.

What is claimed is:

1. A mechanical plug for restricting fluid flow through a conduit, the mechanical plug comprising:
    a first plug portion including
        a first endwall;
        a first sidewall coupled to the first endwall, the first sidewall including a female section extending in a direction along a longitudinal axis of the mechanical plug; and
        a plurality of pins slidably supported by the first sidewall;
    a second plug portion movable relative to the first plug portion, the second plug portion including
        a second sidewall including a male section extending in a direction along the longitudinal axis, the male section configured to mate with the female section, the male section including a cam surface configured to engage the plurality of pins to push the pins laterally outwardly relative to the longitudinal axis;
        a second endwall coupled to the second sidewall; and
        a seal surrounding a portion of the male section, the seal disposed in a region along the longitudinal axis between the second endwall and the female section; and
    an elongate member coupled to the first plug portion and the second plug portion, the elongate member including a threaded fastener extending through the first plug portion and threadingly engaging the second endwall, actuation of the elongate member moving the first plug portion and the second plug portion toward each other to compress the seal in a direction along the longitudinal axis.

2. The mechanical plug of claim 1, wherein the threaded fastener is rotatable to move the first plug portion and the second plug portion toward each other.

3. The mechanical plug of claim 2, wherein the threaded fastener extends through a center of the first plug portion.

4. The mechanical plug of claim 1, wherein the seal includes an elastomeric annular member.

5. The mechanical plug of claim 1, wherein the plurality of pins includes at least three pins circumferentially spaced about the longitudinal axis.

6. The mechanical plug of claim 1, wherein
    the plurality of pins is a first plurality of pins;
    the cam surface is a first cam surface;
    the first plug portion further includes a second plurality of pins slidably supported by the first sidewall, the second plurality of pins offset from the first plurality of pins in a direction along the longitudinal axis;
    the male section further includes a second cam surface offset from the first cam surface in a direction along the longitudinal axis; and
    the second cam surface engages the second plurality of pins to push the pins laterally outward relative to the longitudinal axis.

7. The mechanical plug of claim 6, wherein
    the second plurality of pins includes at least three pins circumferentially spaced about the longitudinal axis; and
    the at least three pins of the first plurality of pins are circumferentially offset from the at least three pins of the second plurality of pins about the longitudinal axis.

8. The mechanical plug of claim 1, wherein the second plug portion further includes an intermediate washer surrounding a portion of the male section, the intermediate washer disposed in a region along the longitudinal axis between the seal and the female section, the intermediate washer configured to directly engage the seal.

9. The mechanical plug of claim 8, wherein
    the seal is a second seal;
    the second plug portion further includes a first seal surrounding a portion of the male section, the first seal disposed in a region along the longitudinal axis between the intermediate washer and the female section; and
    the female section is configured to directly engage the first seal.

10. The mechanical plug of claim 9, further comprising
    a gauge configured to measure pressure between the first seal and the second seal; and
    wherein
        the second sidewall includes a longitudinally extending channel defined therein, the longitudinally extending channel in fluid communication with the gauge; and
        the intermediate washer includes a laterally extending channel defined therein, the laterally extending channel in fluid communication with the longitudinally extending channel and a space between the first seal and the second seal.

11. The mechanical plug of claim 1, further comprising a bypass passage extending through the first plug portion and the second plug portion, the bypass passage configured to selectively allow fluid flow through the first plug portion and the second plug portion.

12. The mechanical plug of claim 1, further comprising
    a first handle coupled to the elongate member;
    a second handle coupled to the first endwall; and
    wherein manipulation of the first handle actuates the elongate member.

13. The mechanical plug of claim 1, wherein the second endwall projects laterally outward beyond the male section to form a flange, the flange configured to directly engage the seal.

14. A mechanical plug for restricting fluid flow through a conduit, the mechanical plug comprising:
    a first plug portion including
        a first endwall;
        a first sidewall coupled to the first endwall, the first sidewall including a female section extending in a direction along a longitudinal axis of the mechanical plug;

a first plurality of pins slidably supported by the first sidewall; and a second plurality of pins slidably supported by the first sidewall, the first plurality of pins disposed along the longitudinal axis between the second plurality of pins and the first endwall;

a second plug portion movable relative to the first plug portion, the second plug portion including a second sidewall including a male section extending in a direction along the longitudinal axis, the male section configured to mate with the female section, the male section including a first cam surface and a second cam surface;

a second endwall coupled to the second sidewall; and a seal surrounding a portion of the male section, the seal disposed in a region along the longitudinal axis between the second endwall and the female section;

an elongate member coupled to the first plug portion and the second plug portion, actuation of the elongate member moving the first plug portion and the second plug portion toward each other to compress the seal in a direction along the longitudinal axis; and wherein the second cam surface is disposed along the longitudinal axis between the first cam surface and the second endwall, a maximum diameter of the first cam surface is greater than a minimum diameter of the second cam surface, the first cam surface engages the first plurality of pins to push the first plurality of pins radially outwardly relative to the longitudinal axis, the second cam surface engages the second plurality of pins to push the second plurality of pins radially outwardly relative to the longitudinal axis.

15. The mechanical plug of claim 14, wherein the first plurality of pins includes at least three pins circumferentially spaced about the longitudinal axis.

16. The mechanical plug of claim 15, wherein the second plurality of pins includes at least three pins circumferentially spaced about the longitudinal axis; and the at least three pins of the first plurality of pins are circumferentially offset from the at least three pins of the second plurality of pins about the longitudinal axis.

17. A mechanical plug for restricting fluid flow through a conduit, the mechanical plug comprising:

a first plug portion including a first endwall; and a first sidewall coupled to the first endwall, the first sidewall including a female section extending in a direction along a longitudinal axis of the mechanical plug;

a second plug portion movable relative to the first plug portion, the second plug portion including a second sidewall including a male section extending in a direction along the longitudinal axis, the male section configured to mate with the female section;

a second endwall coupled to the second sidewall; and a seal surrounding a portion of the male section, the seal disposed in a region along the longitudinal axis between the second endwall and the female section;

an elongate member coupled to the first plug portion and the second plug portion, actuation of the elongate member moving the first plug portion and the second plug portion toward each other to compress the seal in a direction along the longitudinal axis; and a bypass passage extending through the first endwall of the first plug portion and the second endwall of the second plug portion, the bypass passage disposed at a position outside of the elongate member, the bypass passage configured to selectively allow fluid flow through the first plug portion and the second plug portion.

\* \* \* \* \*